(12) United States Patent
Ohtsu et al.

(10) Patent No.: US 7,747,115 B2
(45) Date of Patent: Jun. 29, 2010

(54) OPTICAL WAVEGUIDE DEVICE AND LIGHT OUTPUTTING MODULE

(75) Inventors: Shigemi Ohtsu, Ashigarakami-gun (JP); Toshihiko Suzuki, Ashigarakami-gun (JP); Keishi Shimizu, Ashigarakami-gun (JP); Kazutoshi Yatsuda, Ashigarakami-gun (JP); Akira Fujii, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/053,468

(22) Filed: Mar. 21, 2008

(65) Prior Publication Data

US 2009/0067786 A1 Mar. 12, 2009

(30) Foreign Application Priority Data

Sep. 12, 2007 (JP) .............................. 2007-236413

(51) Int. Cl.
*G02B 6/26* (2006.01)
*G02B 6/42* (2006.01)

(52) U.S. Cl. .............................. 385/47; 385/48; 385/15

(58) Field of Classification Search .................. 385/47, 385/48
See application file for complete search history.

(56) References Cited

U.S. PATENT DOCUMENTS

| 4,247,832 | A | * | 1/1981 | Sanders et al. ................. 372/94 |
| 4,280,751 | A | * | 7/1981 | DiVita ........................... 385/45 |
| 4,306,765 | A | * | 12/1981 | Winzer et al. .................. 385/47 |
| 4,578,793 | A | * | 3/1986 | Kane et al. ..................... 372/94 |
| 4,747,111 | A | * | 5/1988 | Trutna et al. ................... 372/94 |
| 4,813,774 | A | * | 3/1989 | Dorschner et al. ............. 359/247 |
| 5,007,065 | A | * | 4/1991 | Trutna, Jr. ..................... 372/94 |
| 5,121,404 | A | * | 6/1992 | Aoshima et al. ............... 372/75 |
| 6,172,356 | B1 | * | 1/2001 | Ogura et al. .............. 250/227.11 |
| 6,243,516 | B1 | * | 6/2001 | Seino ........................... 385/47 |
| 6,862,387 | B2 | * | 3/2005 | Howerton et al. .............. 385/47 |
| 6,961,166 | B2 | * | 11/2005 | Wooten et al. ............... 359/245 |
| 7,006,736 | B2 | * | 2/2006 | Lee et al. ....................... 385/47 |
| 7,058,266 | B2 | * | 6/2006 | Arakida et al. ................ 385/47 |
| 7,203,398 | B2 | * | 4/2007 | Koontz et al. ................. 385/37 |
| 7,496,120 | B2 | * | 2/2009 | Wang et al. .............. 372/29.02 |
| 2004/0001661 | A1 | * | 1/2004 | Iwaki et al. .................... 385/14 |
| 2004/0245660 | A1 | * | 12/2004 | Ohtsu et al. ................. 264/1.27 |
| 2005/0074207 | A1 | * | 4/2005 | Shioda et al. .................. 385/31 |
| 2005/0265663 | A1 | * | 12/2005 | Maruyama et al. ............. 385/47 |

(Continued)

FOREIGN PATENT DOCUMENTS

DE 19728388 A1 * 1/1999

(Continued)

*Primary Examiner*—Charlie Peng
*Assistant Examiner*—Robert Tavlykaev
(74) *Attorney, Agent, or Firm*—Sughrue Mion, PLLC (57) ABSTRACT

An optical waveguide device includes: a waveguide core that guides light; a mirror surface that deflects light coming from the waveguide core by 90°; a main waveguide core that guides light deflected at the mirror surface; a waveguide core for monitoring that branches the light deflected at the mirror surface off from the main waveguide core, and guides the light in a different direction, the mirror surface being disposed at a branching portion of the waveguide core for monitoring; and a clad portion that surrounds the waveguide core, the main waveguide core and the waveguide core for monitoring.

20 Claims, 11 Drawing Sheets

U.S. PATENT DOCUMENTS

2006/0056002 A1* 3/2006 Wooten et al. .............. 359/245
2006/0275004 A1* 12/2006 Fujii et al. ................. 385/129

FOREIGN PATENT DOCUMENTS

| JP | 05-224044 A | 9/1993 |
| JP | 8-286064 A | 1/1996 |
| JP | 11-330624 A | 11/1999 |
| WO | WO 02/97482 A2 * | 5/2002 |

* cited by examiner

OPTICAL WAVEGUIDE DEVICE AND LIGHT OUTPUTTING MODULE

CROSS-REFERENCE TO RELATED APPLICATION

This application is based on and claims priority under 35 USC 119 from Japanese Patent Application No. 2007-236413 filed on Sep. 12, 2007.

BACKGROUND

1. Technical Field

The present invention relates to an optical waveguide device which is used in a mobile apparatus or the like and guides light as a waveguide, and to a light outputting module using the optical waveguide device.

2. Related Art

Examples of methods of fabricating an optical waveguide film as an optical waveguide device are: (1) a method of impregnating a film with a monomer, selectively exposing a core portion so as to change the refractive index, and laminating films together (a selective polymerization method); (2) a method of coating a core layer and a clad portion, and thereafter, forming the clad portion by using reactive ion etching (RIE method); (3) a method using photolithography which carries out exposure and development by using an ultraviolet-curing resin which is obtained by adding a photosensitive material into a polymer material (a direct exposure method); (4) a method using injection molding; (5) a method of coating a core layer and a clad portion, and thereafter, exposing a core portion so as to change the refractive index of the core portion (a photobleaching method); and the like. Further, when limited to a rectilinear waveguide, there are methods such as a method of fabricating the optical waveguide including forming a core portion of the optical waveguide by locally cutting and removing, by a dicing saw or the like, the layer which becomes the core and which has a high refractive index and is obtained by laminating two layers of resin having different refractive indices, and thereafter, covering the core portion with the same polymer resin as the clad portion, and the like.

However, in recent years, in IC technologies and LSI technologies, attention has focused on carrying out optical wiring between apparatuses and between the boards and between the chips within the apparatuses, instead of carrying out high density electrical wiring, in order to improve the operational speed and the degree of integration. In order to realize such optical wiring, surface emitting elements having an excellent high-speed characteristic and mass-production characteristic, and VCSEL elements in particular, are used for interconnection applications and applications for optical communications. However, differently than edge emitter elements, it is difficult to monitor the light output of a VCSEL element as a unit.

Thus, in elements at which a VCSEL element is packaged, a method is usually used in which a portion of light coming from a window for output is reflected, and this reflected light is used in monitoring the light output. However, reflecting and taking-out a portion of light coming from a window for output is inefficient, and excess current must be sent to the VCSEL element so as to increase the light output. At this time, excessively complex external circuits that also are needed as temperature control is required in order to avoid the effects of heat, or the like.

SUMMARY

An optical waveguide device of a first aspect of the present invention includes: a waveguide core that guides light; a mirror surface that deflects light coming from the waveguide core by 90°; a main waveguide core that guides light deflected at the mirror surface; a waveguide core for monitoring that branches the light deflected at the mirror surface off from the main waveguide core, and guides the light in a different direction, the mirror surface being disposed at a branching portion of the waveguide core for monitoring; and a clad portion that surrounds the waveguide core, the main waveguide core and the waveguide core for monitoring.

BRIEF DESCRIPTION OF THE DRAWINGS

Exemplary embodiments of the present invention will be described in detail based on the following figures, wherein.

DETAILED DESCRIPTION

Examples of exemplary embodiments of the present invention will be described in detail hereinafter with reference to the drawings.

[Branched Optical Waveguides]

A branched waveguide is generally structured by a core portion having a high refractive index, and a clad portion which surrounds the core portion and has a lower refractive index than the core portion. The greater the difference in refractive indices between the core portion and the clad portion, the smaller the radius of curvature of a curved portion can be made without causing a loss at the time of bending. On the other hand, the greater the difference in refractive indices, the larger the spread angle of the light output and the greater the connection loss in a case of being connected to an optical fiber. Thus, the difference in refractive indices between the core portion and the clad portion is preferably made to be about 0.5 to 5%.

Figure 11A:
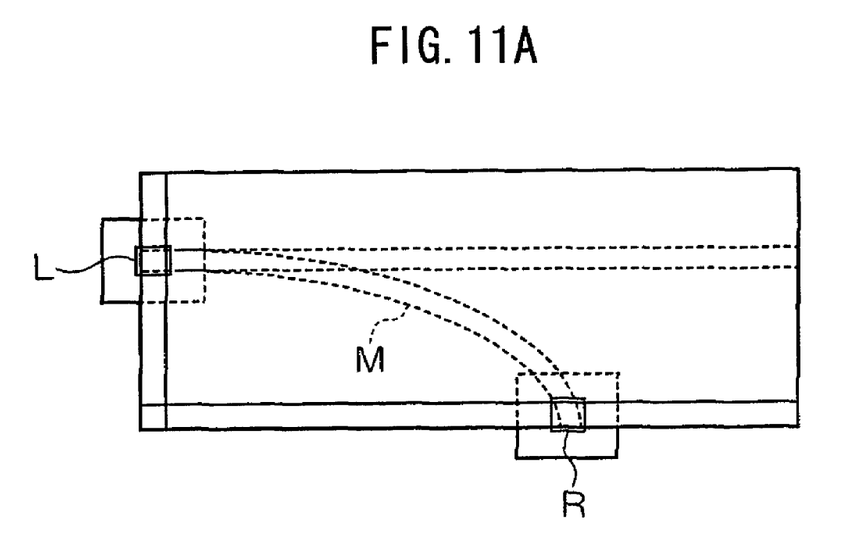
FIGS. 11A and 11B are schematic top views of conventional optical waveguide devices.
Figure 11B:
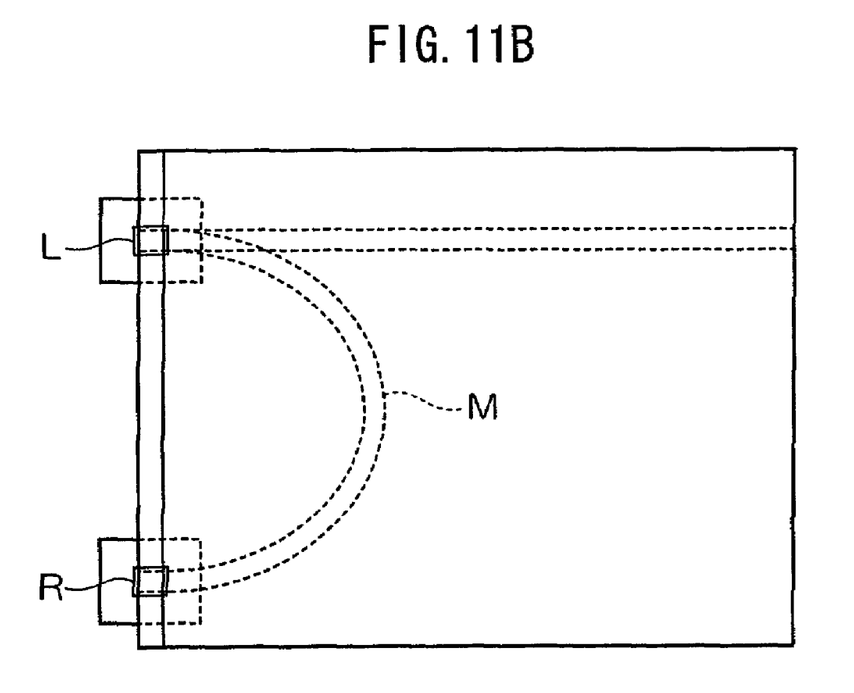

In the case of using a branched waveguide and monitoring the light from a surface emitting laser (VCSEL: Vertical Cavity Surface Emitting Laser) by using a waveguide M for monitoring, because the lower limit of the radius of curvature is prescribed, a light-receiving element R for monitoring must be placed at a surface which is different than the surface emitting laser L, as shown in FIG. 11A. Further, if the surface emitting laser L and the light-receiving element R for monitoring are disposed on the same straight line, as shown in FIG. 11B, the direction in which the light advances must be turned-around in the form of an arc, and the size of the waveguide device increases.

Thus, in the present exemplary embodiments, optical waveguide devices having a waveguide core for monitoring are structured as follows.

First Exemplary Embodiment

Figure 1:
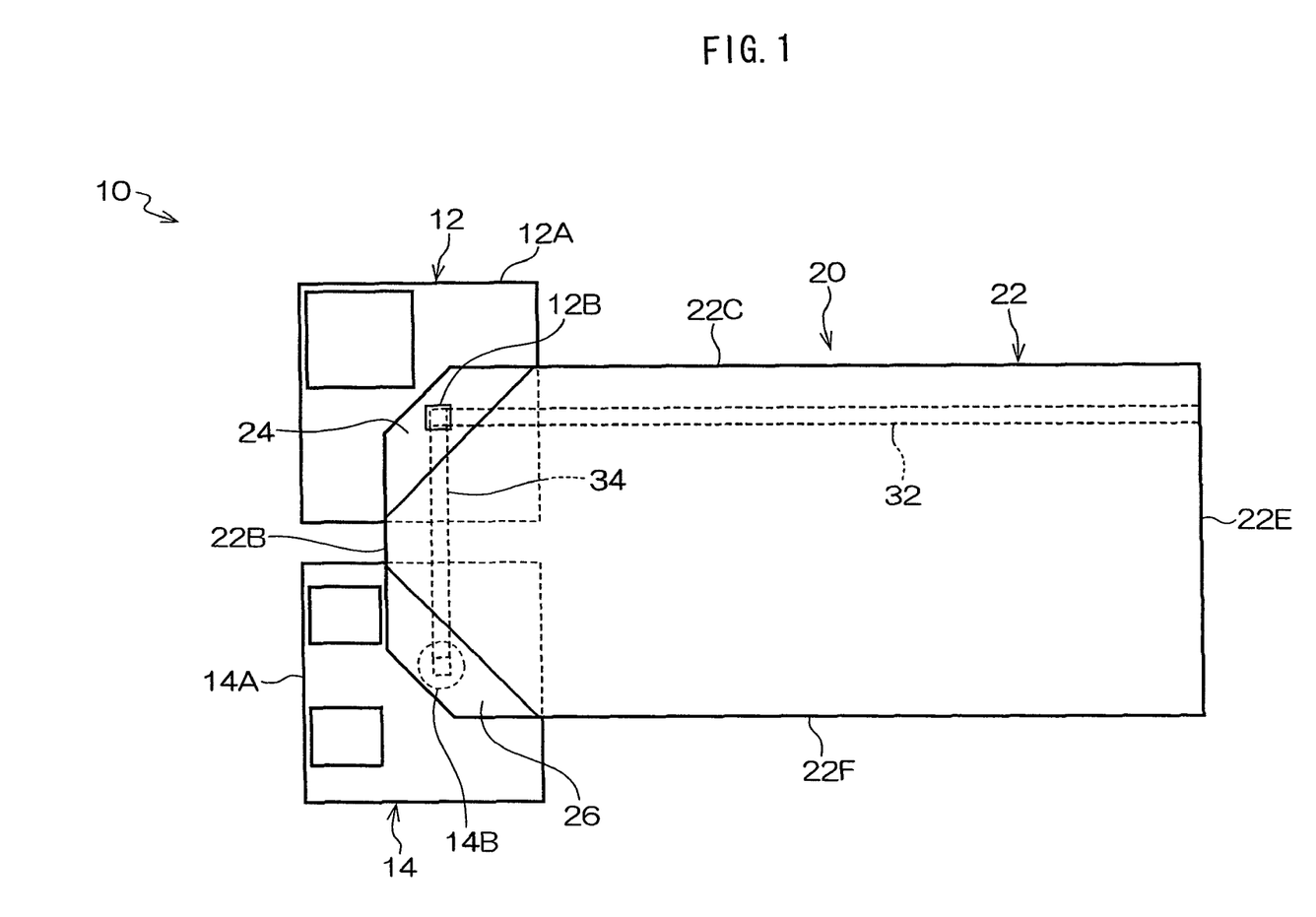
FIG. 1 is a schematic structural diagram of a light outputting module relating to a first exemplary embodiment.

FIG. 1 is a schematic structural diagram of an optical waveguide device and a light outputting module relating to the present exemplary embodiment. As shown in FIG. 1, a light outputting module 10 has an optical waveguide device 20, a surface emitting laser section 12, and a light-receiving element section 14.

Figure 2:
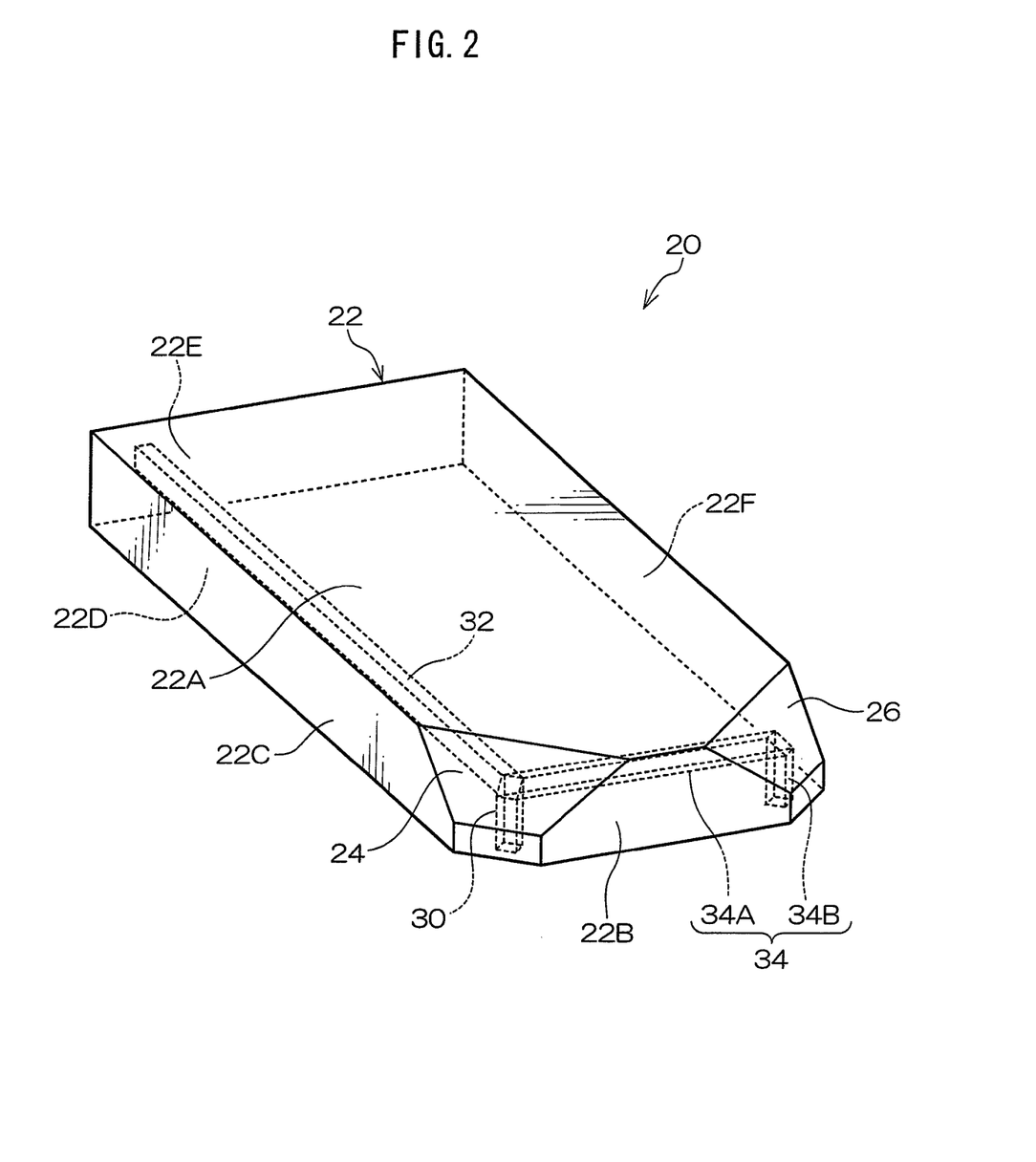
FIG. 2 is a perspective view of an optical waveguide device relating to the first exemplary embodiment.

As shown in FIG. 2, the optical waveguide device 20 has a rectangular-plate-shaped clad portion 22. The clad portion 22 is a portion which structures the main body of the optical waveguide device 20, and can be formed of a transparent resin film or the like. A first mirror surface 24 and a second mirror surface 26 are structured at corner portions of the rectangle of the clad portion 22. The first mirror surface 24 and the second mirror surface 26 are respectively structured at the upper sides of corner portions which are adjacent to one another with a short side of the rectangle of the clad portion 22 located therebetween. The first mirror surface 24 and the second mirror surface 26 are structured to form 45° angles with a top surface 22A, a side surface 22B at the short side, and a side surface 22C at the long side of the clad portion 22. The first mirror surface 24 and the second mirror surface 26 function as optical path changing surfaces which change the optical path of the light. Note that the 45° angles here may deviate, for example, ±10% in light of mechanical precision.

Figure 3A:
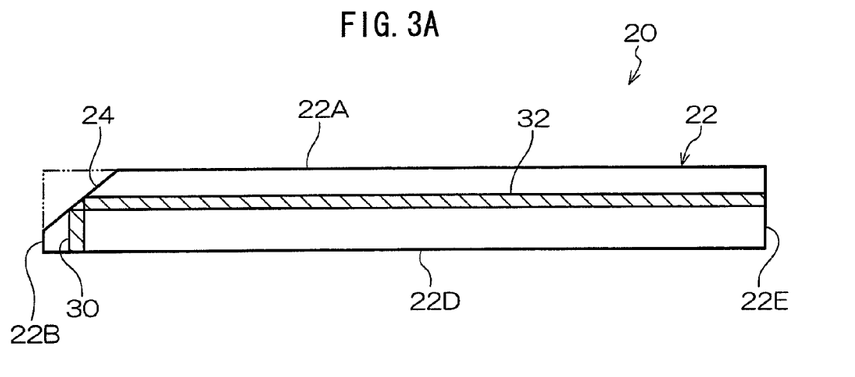
FIG. 3A is a side sectional view of the optical waveguide device relating to the first exemplary embodiment.
Figure 3B:
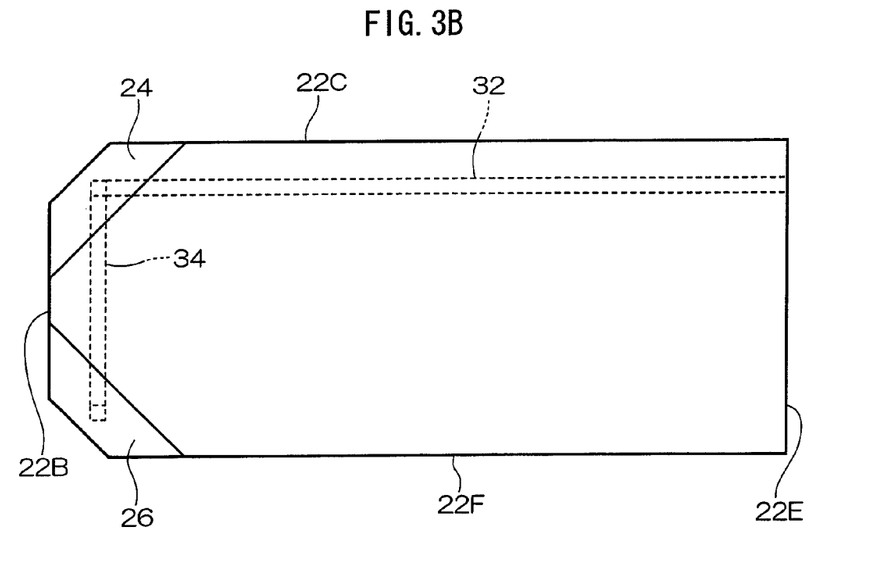
FIG. 3B is a top view thereof.

A waveguide core 30, a main waveguide core 32 and a waveguide core 34 for monitoring, which guide light, are formed at the clad portion 22 so as to be covered by the clad portion 22. The waveguide core 30, the main waveguide core 32, and the waveguide core 34 for monitoring are structured of a material having a higher refractive index than the clad portion 22. As shown in FIG. 3A and FIG. 3B as well, the waveguide core 30 is disposed in the direction of thickness (thickness direction) of the clad portion 22 such that the one end of the waveguide core 30 is disposed at a bottom surface 22D of the clad portion 22 and the other end thereof is disposed at the first mirror surface 24. The main waveguide core 32 is disposed in the longitudinal direction (length direction) of the clad portion 22 along the top surface 22A, such that one end of the main waveguide core 32 is connected to the first mirror surface 24 side end portion of the waveguide core 30, and the other end of the main waveguide core 32 reaches a side surface 22E which opposes the side surface 22B. The waveguide core 34 for monitoring is structured by a waveguide core 34A for monitoring which is disposed in the short-side direction (width direction) of the clad portion 22, and a waveguide core 34B for monitoring which is disposed in the direction of thickness of the clad portion 22. The waveguide core 34A for monitoring is disposed in the short-side direction of the clad portion 22 such that one end of the waveguide core 34A for monitoring is connected to the first mirror surface 24 side end portion of the waveguide core 30, and the other end of the waveguide core 34A for monitoring is disposed at the second mirror surface 26. The waveguide core 34B for monitoring is disposed in the direction of thickness of the clad portion 22 such that one end of the waveguide core 34B for monitoring is connected to the second mirror surface 26 side end portion of the waveguide core 34A for monitoring, and the other end of the waveguide core 34B for monitoring is disposed at the bottom surface 22D. The light, which is incident from the bottom surface 22D side of the waveguide core 30, reaches the first mirror surface 24, and, at the first mirror surface 24, is branched toward the longitudinal direction main waveguide core 32 side and the short-side direction waveguide core 34 for monitoring side, which run along the top surface 22A of the clad portion 22. Then, the branched-off light of the main waveguide core 32 side reaches the side surface 22E and is used as light output. The branched-off light of the waveguide core 34 for monitoring side reaches the second mirror surface 26 via the waveguide core 34A for monitoring, and is reflected toward the bottom surface 22D, and is outputted from the bottom surface 22D side of the waveguide core 34B for monitoring and used for monitoring the output.

The optical waveguide device 20 of the present exemplary embodiment can be fabricated by using any of various methods, such as, for example, a reproducing method utilizing a mold which uses a silicone resin, a method using a stamper, a method utilizing cutting which uses a dicing saw, a direct exposure method, or the like.

Further, ultraviolet-curing or thermosetting (heat-curing) epoxy resins or acrylic resins can be used as the materials of the clad portion 22, the waveguide core 30, the main waveguide core 32, and the waveguide core 34 for monitoring.

The first mirror surface 24 and the second mirror surface 26 can be structured by cutting by using a dicing saw having a 45° blade. Note that, in order to ensure the reflecting precision of the first mirror surface 24 and the second mirror surface 26, the first mirror surface 24 and the second mirror surface 26 are preferably flat surfaces whose surface roughnesses are greater than or equal to 1 nm and less than or equal to 50 nm.

In the present exemplary embodiment, as described above, by structuring the first mirror surface 24 at the branching portion of the main waveguide core 32 and the waveguide core 34 for monitoring, the waveguide core 34 for monitoring which has little loss can be structured, and further, the output end portion of the waveguide core 34 for monitoring can be disposed at a corner portion which is adjacent to the corner portion at which the input end portion of the waveguide core 30 is disposed.

As shown in FIG. 1, the surface emitting laser section 12 has a base material 12A and a surface emitting element 12B. The surface emitting element 12B is a surface emitting laser (VCSEL: Vertical Cavity Surface Emitting Laser) at which plural light-emitting points, which emit laser light, are arrayed two-dimensionally. The surface emitting laser section 12 is disposed at the first mirror surface 24 side corner portion of the bottom surface 22D of the clad portion 22, such that the surface emitting element 12B is disposed in a vicinity of the end portion of the waveguide core 30 and the laser light from the surface emitting element 12B exits toward the waveguide core 30.

The light-receiving element section 14 has a substrate 14A and a light-receiving element 14B. The light-receiving element 14B is structured by a photodiode. The light-receiving element section 14 is disposed at the second mirror surface 26 side corner portion of the bottom surface 22D of the clad portion 22, such that the light-receiving element 14B is disposed at the end portion of the waveguide core 34 for monitoring and can receive the laser light from the waveguide core 34 for monitoring.

In the present exemplary embodiment, as described above, the input end portion of the waveguide core 30 and the output end portion of the waveguide core 34 for monitoring are respectively disposed at corner portions which are adjacent to one another along a short-side direction end side of the clad portion 22. Therefore, the surface emitting laser section 12 and the light-receiving element section 14 can together be disposed at one side of the clad portion 22. Accordingly, the light outputting module 10 can be designed to be compact.

Note that the present exemplary embodiment describes, as an example, providing the second mirror surface 26 which is for deflecting, downward in the direction of thickness, the light which is guided by the waveguide core 34 for monitoring. However, the second mirror surface 26 is not absolutely necessary, and the waveguide core 34A for monitoring may be made to pass-through toward a side surface 22F of the clad portion 22.

Figure 4A:
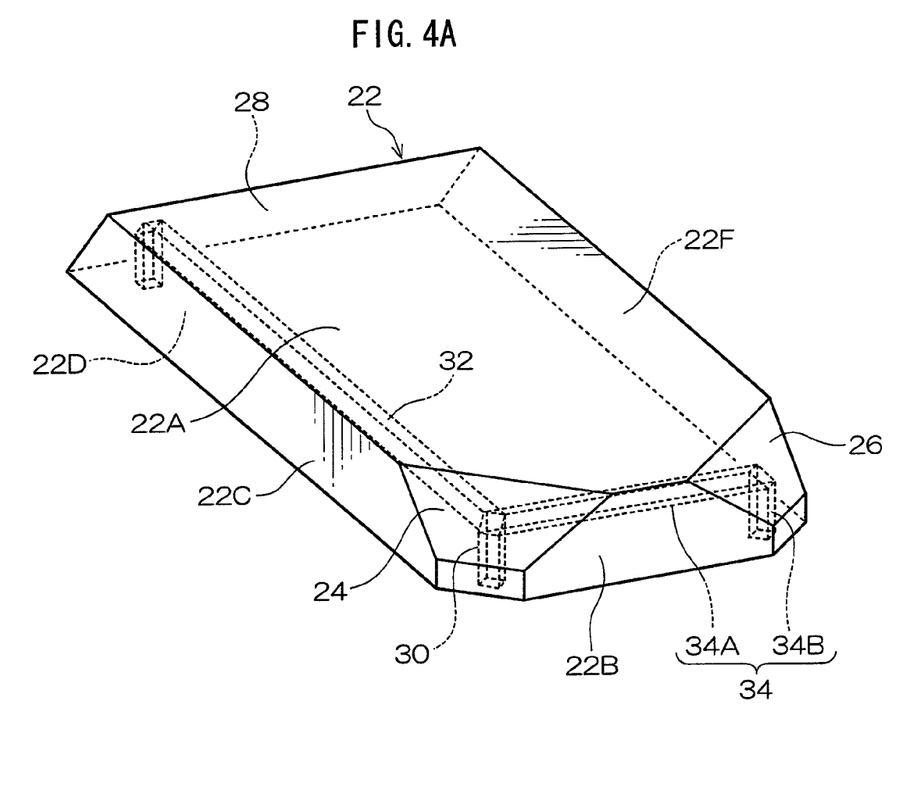
FIG. 4A is a perspective view of a modified example of the optical waveguide device relating to the first exemplary embodiment.
Figure 4B:
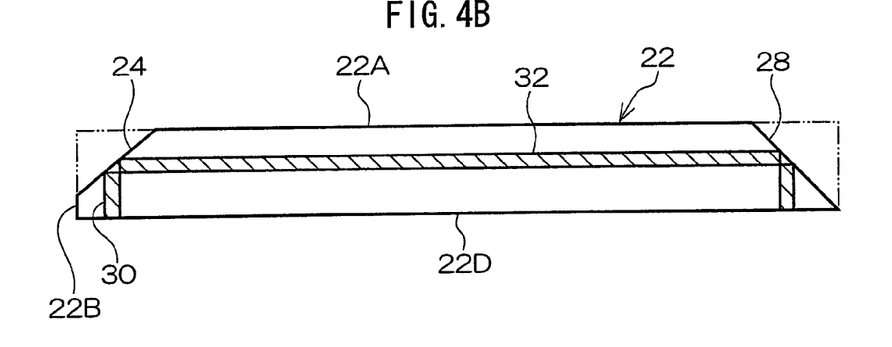
FIG. 4B is a side sectional view thereof.
Figure 5A:
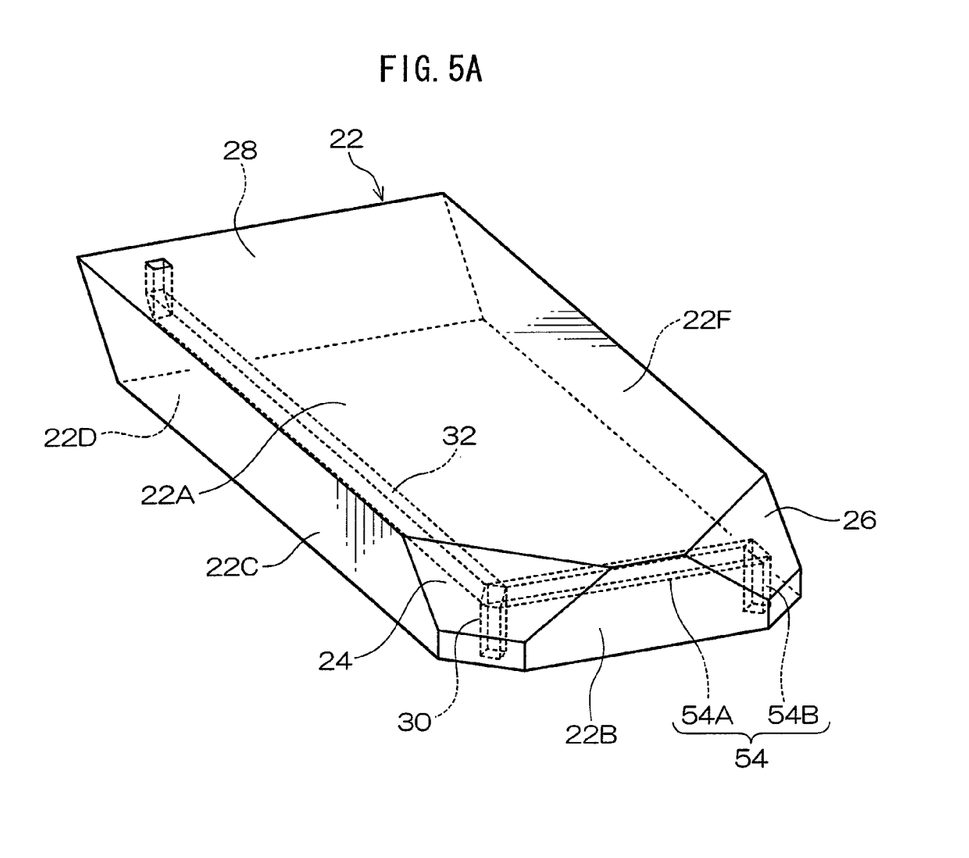
FIG. 5A is a perspective view of another modified example of the optical waveguide device relating to the first exemplary embodiment.
Figure 5B:
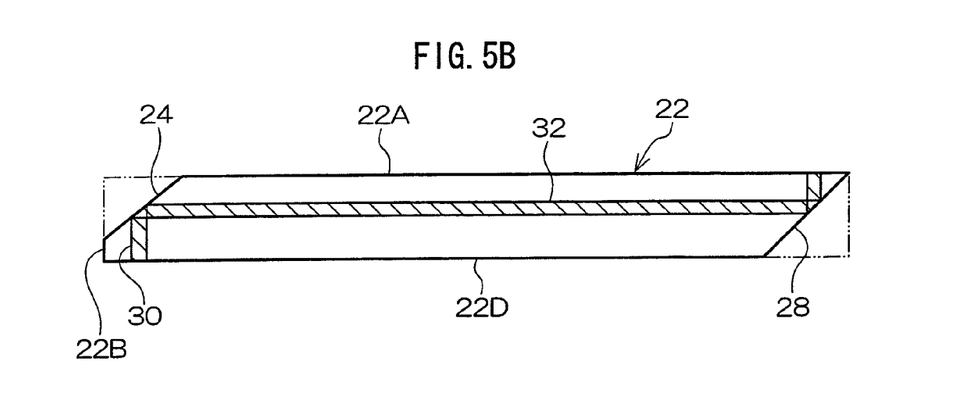
FIG. 5B is a side sectional view thereof.

Further, a third mirror surface 28, which is for deflecting light by 90° in the direction of thickness, may be provided at the side surface 22E side of the clad portion 22. The third mirror surface 28 may be structured at a 45° angle in the direction deflecting toward the bottom surface 22D as shown in FIG. 4A and FIG. 4B, or may be structured at a 45° angle in the direction deflecting toward the top surface 22A as shown in FIG. 5A and FIG. 5B. By deflecting toward the bottom surface 22D at the third mirror surface 28, the output direction of the light can be returned toward the surface emitting element 12B side. By deflecting toward the top surface 22A at the third mirror surface 28, the output direction of the light can be made to be the same direction as the output direction from the surface emitting element 12B.

Figure 6:
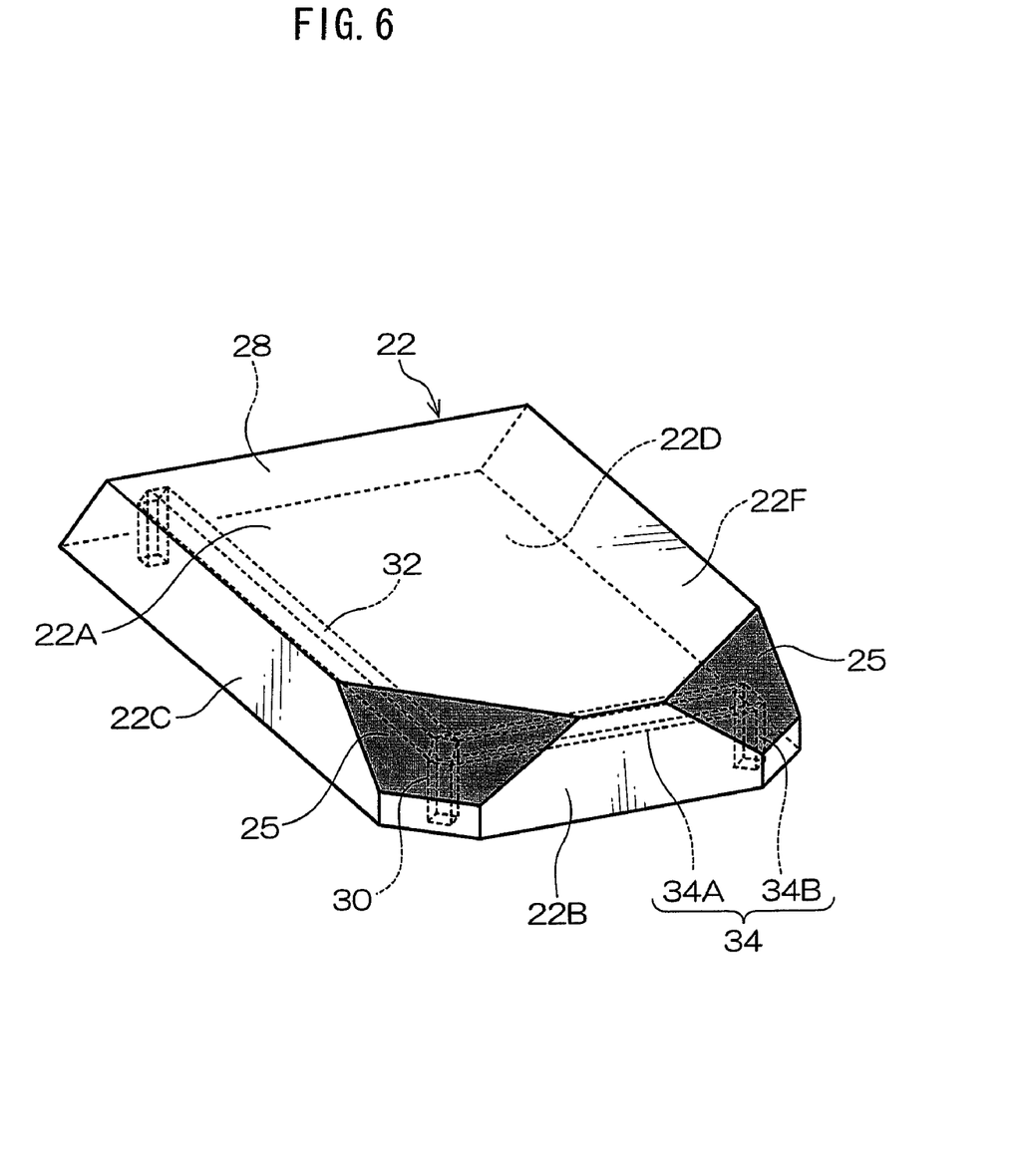
FIG. 6 is a perspective view of yet another modified example of the optical waveguide device relating to the first exemplary embodiment.

Further, as shown in FIG. 6, the above-described first mirror surface 24, second mirror surface 26 and third mirror surface 28 may be structured such that metal films 25 are disposed at the outer sides. By providing the metal films 25 in this way, the light outputting module 10 can be easily packed.

Note that gold, silver, copper, or an alloy of any of these can be used as the metal films 25. In consideration of cost and the reflectance, silver or a silver alloy is preferable. Further, the formation of the metal films 25 can be carried out by depositing by sputtering, vapor deposition, or the like.

Second Exemplary Embodiment

A second exemplary embodiment of the present invention will be described next. In the present exemplary embodiment, portions which are the same as in the first exemplary embodiment are denoted by the same reference numerals, and detailed description thereof is omitted.

Figure 7:
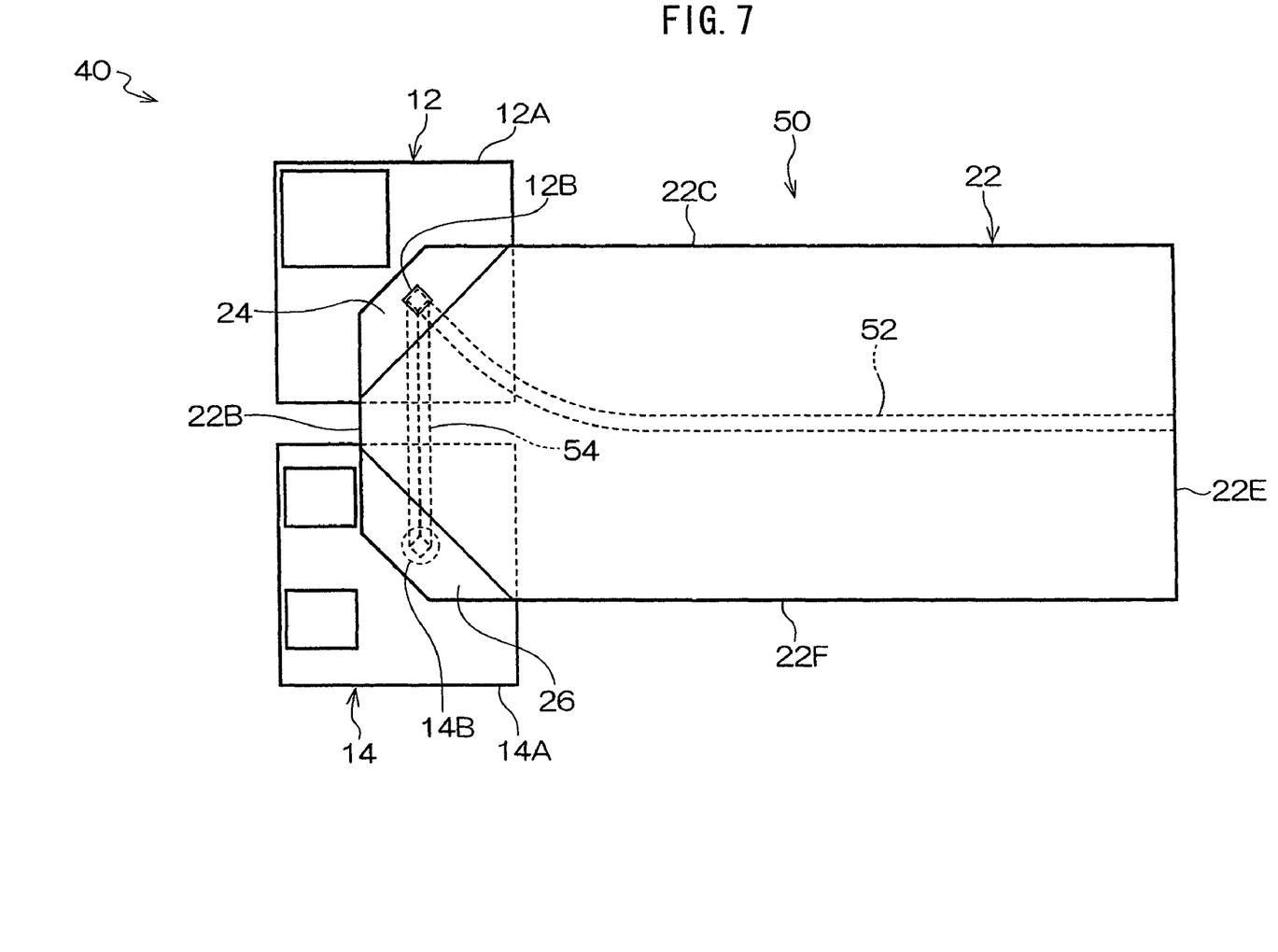
FIG. 7 is a schematic structure diagram of a light outputting module relating to a second exemplary embodiment.

FIG. 7 is a schematic structural diagram of an optical waveguide device and a light outputting module relating to the present exemplary embodiment. As shown in FIG. 7, a light outputting module 40 has an optical waveguide device 50, the surface emitting laser section 12, and the light-receiving element section 14.

Figure 8:
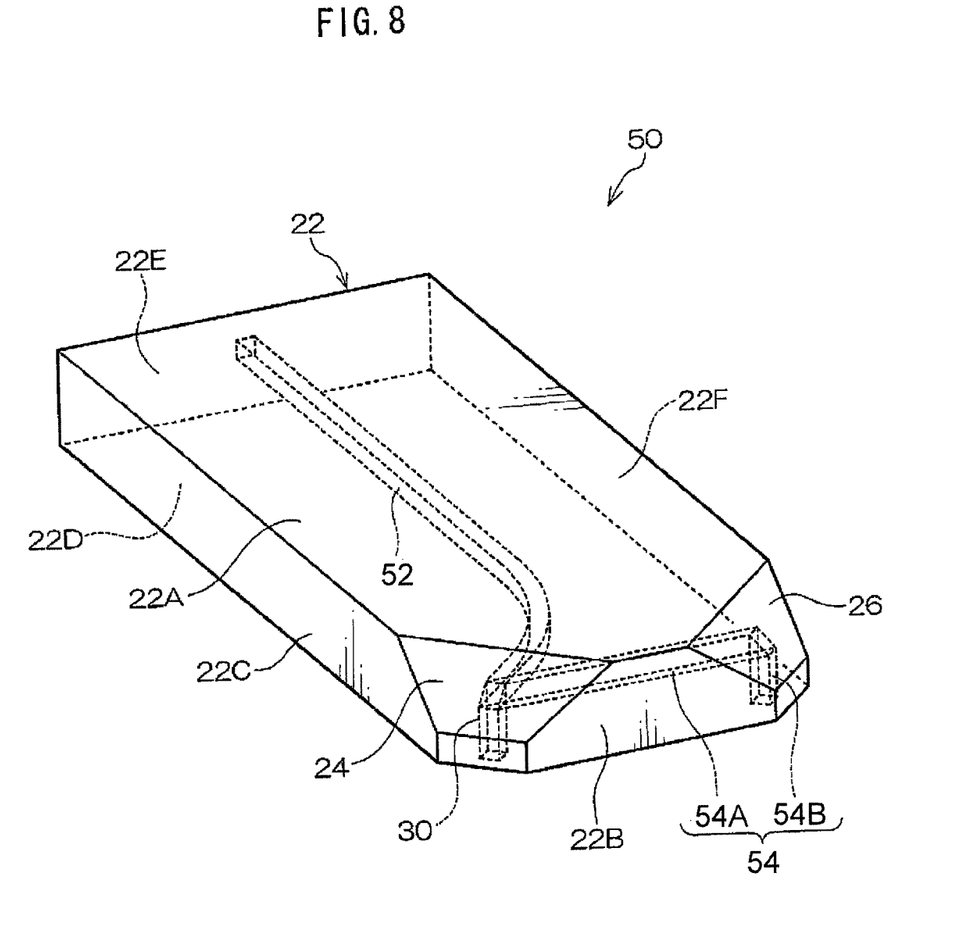
FIG. 8 is a perspective view of an optical waveguide device relating to the second exemplary embodiment.

As shown in FIG. 8, the optical waveguide device 50 has the rectangular-plate-shaped clad portion 22. The first mirror surface 24 and the second mirror surface 26 are structured at corner portions of the rectangle of the clad portion 22.

Figure 9A:
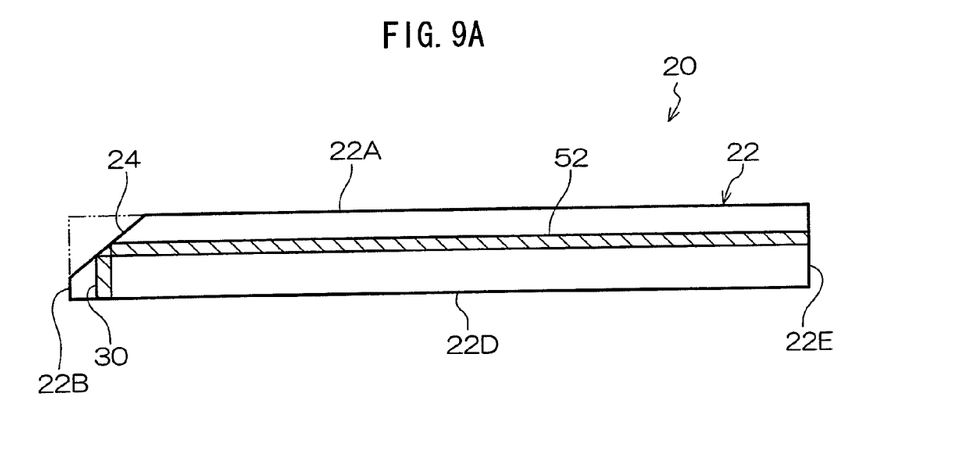
FIG. 9A is a side sectional view of the optical waveguide device relating to the second exemplary embodiment.
Figure 9B:
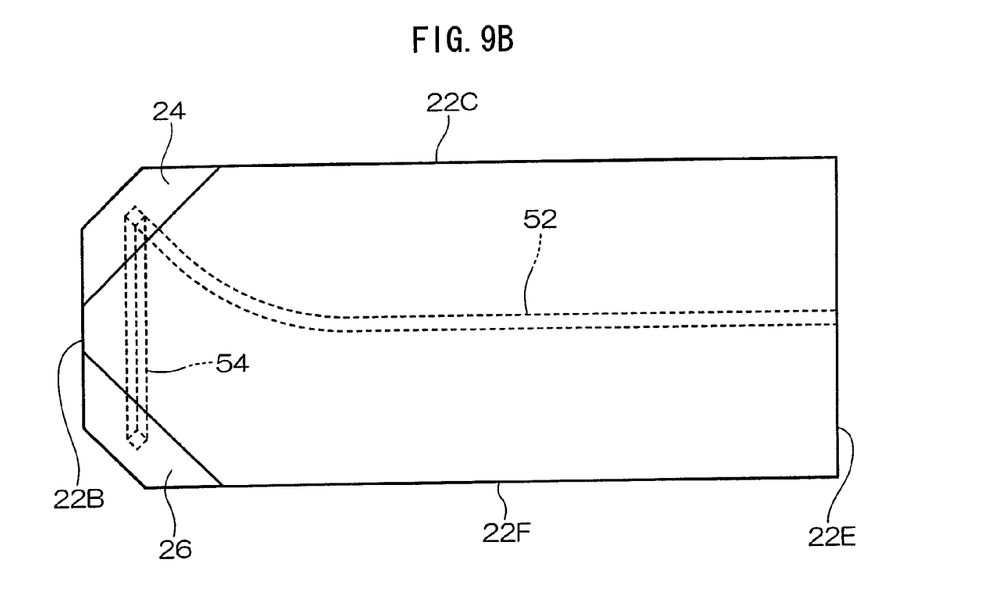
FIG. 9B is a top view thereof.

As shown in FIG. 9A and FIG. 9B as well, the waveguide core 30, a main waveguide core 52 and a waveguide core 54 for monitoring, which guide light, are formed at the clad portion 22 so as to be covered by the clad portion 22. The waveguide core 30 is disposed in the direction of thickness of the clad portion 22 such that one end of the waveguide core 30 is disposed at the bottom surface 22D of the clad portion 22 and the other end thereof is disposed at the first mirror surface 24. One end of the main waveguide core 52 is connected to the first mirror surface 24 side end portion of the waveguide core 30, and, as seen from the top surface 22A side, extends out in a perpendicular direction from the first mirror surface 24, and is bent gradually such that the orientation thereof is changed to the longitudinal direction of the clad portion 22. The other end of the main waveguide core 52 is disposed at the side surface 22E which opposes the side surface 22B. The waveguide core 54 for monitoring is structured by a waveguide core 54A for monitoring which is disposed in the short-side direction of the clad portion 22, and a waveguide core 54B for monitoring which is disposed in the direction of thickness of the clad portion 22. The waveguide core 54A for monitoring is disposed in the short-side direction of the clad portion 22 such that one end of the waveguide core 54A for monitoring is branched-off from the first mirror surface 24 side end portion of the main waveguide core 52, and the other end of the waveguide core 54A for monitoring is disposed at the second mirror surface 26. The waveguide core 54B for monitoring is disposed in the direction of thickness of the clad portion 22 such that one end of the waveguide core 54B for monitoring is connected to the second mirror surface 26 side end portion of the waveguide core 54A for monitoring, and the other end of the waveguide core 54B for monitoring is disposed at the bottom surface 22D. Namely, the light, which is incident from the bottom surface 22D side of the waveguide core 30, reaches the first mirror surface 24, and, at the first mirror surface 24, is branched toward the main waveguide core 52 side, which is bent so as be directed in the longitudinal direction along the top surface 22A of the clad portion 22, and the waveguide core 54 for monitoring side which is directed in the short-side direction. Then, the branched-off light of the main waveguide core 52 side reaches the side surface 22E and is used as light output. The branched-off light of the waveguide core 54 for monitoring side reaches the second mirror surface 26 via the waveguide core 54A for monitoring, and, at the second mirror surface 26, is reflected toward the bottom surface 22D, and is outputted from the bottom surface 22D side of the waveguide core 54B for monitoring and used for monitoring the output.

In the present exemplary embodiment, the first mirror surface 24 is formed at a corner portion of the rectangle as described above. Therefore, the main waveguide core 52 can be extended from the corner portion of the rectangle toward the inner side without a loss of light, and can be bent toward the output end portion. Further, the waveguide core 54 for monitoring can be easily branched toward the short-side direction of the clad portion 22 from the main waveguide core 52 which extends toward the inner side from the corner portion of the rectangle of the clad portion 22. The output end portion of the waveguide core 54 for monitoring can be disposed at a corner portion which is adjacent to the corner portion at which the input end portion of the waveguide core 30 is disposed.

Note that the optical waveguide device 50 of the present exemplary embodiment can be fabricated in the same way as the optical waveguide device 20 of the first exemplary embodiment.

EXAMPLE 1

(Fabrication of Optical Waveguide Device)

A thick-film resist (SU-8 manufactured by Microchemical KK) is coated by spin coating onto an Si substrate. Thereafter, pre-baking is carried out at 80° C., exposure and development are carried out through a photomask, and a convex portion (width: 50 µm, height: 50 µm), which has a square cross-section and at which two straight lines intersect at 90° (see FIG. 3B) is formed.

Next, after a mold releasing agent is coated on this original plate, a mixture of a thermosetting (heat-curing) liquid dimethylsiloxane rubber (SYLGARD 184 manufactured by Dow Corning Asia Ltd., viscosity: 5000 mPa·s) and a curing agent thereof is made to flow in, and is heated at 120° C. for 30 minutes so as to be cured. Thereafter, peeling is carried out, and a mold (mold thickness: 5 mm), which has a concave portion corresponding to a convex portion having a rectangular cross-section, is prepared.

Further, through-holes, whose planar configurations are circular and whose cross-sectional configurations in the direction of thickness of the mold are taper-shaped, are formed by punching at one end and at the other end of the concave portion so as to communicate with the concave portion, and the mold is prepared.

This mold and a film base material for cladding (ARTON film manufactured by JSR Corporation, refractive index: 1.510), which has a film thickness of 100 µm and is slightly larger than the mold, are fit tightly together. Next, when several drops of an ultraviolet-curing resin of a viscosity of 500 mPa·s are placed into the entry side through-hole of the mold, and reduced-pressure suctioning is carried out from the discharging side (reduced-pressure suctioning side) through-hole, the ultraviolet-curing resin is filed within the concave portion in 10 minutes. Then, UV light of 50 mW/cm² is illuminated for 5 minutes from above the mold, and ultraviolet curing is carried out. When the mold is peeled-off from the ARTON film, a core of the same shape as the convex portion of the original plate is formed on the ARTON film.

Next, an ultraviolet-curing resin, whose refractive index after curing is 1.510 which is the same as the ARTON film, is coated on the surface of the ARTON film at which the core is formed. Thereafter, a film base material for cladding of 100 µm is laminated. By illuminating UV light of 50 mW/cm² for 5 minutes and carrying out ultraviolet curing, the two films are adhered together, such that a waveguide sheet having a branched waveguide of a film thickness of 270 µm is prepared.

Then, by using a dicing saw having a 45° angle blade, two of the transverse direction corner portions of the waveguide sheet are cut-off at an angle of 45° with respect to the optical axis. The rectilinear waveguides, which are orthogonal to one another and are shown in FIG. 2 and have 45° surfaces (the first mirror surface 24 and the second mirror surface 26) at the corner portions, are formed.

The optical waveguide device 20 of the first exemplary embodiment is prepared in this way.

(Formation of Metal Mirrors)

Silver alloy films of a film thickness of 100 nm are formed by sputtering on the first mirror surface 24 and the second mirror surface 26.

EXAMPLE 2

(Fabrication of Optical Waveguide Device)

A waveguide sheet having a branched waveguide of a thickness of 270 82 m is prepared in the same way as in Example 1, except that the master pattern of the SU-8 formed on the Si substrate has the structure shown in FIG. 9B.

Then, by using a dicing saw having a 45° angle blade, two of the transverse direction corner portions of the waveguide sheet are cut-off at an angle of 45° with respect to the optical axis. The branched waveguide, which is shown in FIG. 8 and has 45° surfaces (the first mirror surface 24 and the second mirror surface 26) at the corner portions, is formed.

The optical waveguide device 50 of the second exemplary embodiment is prepared in this way.

(Formation of Metal Mirrors)

Silver alloy films of a film thickness of 100 nm are formed by sputtering on the first mirror surface 24 and the second mirror surface 26.

EXAMPLE 3

(Fabrication of Optical Waveguide Device)

A waveguide sheet having a branched waveguide of a thickness of 270 µm is prepared in the same way as in Example 2.

Figure 10:
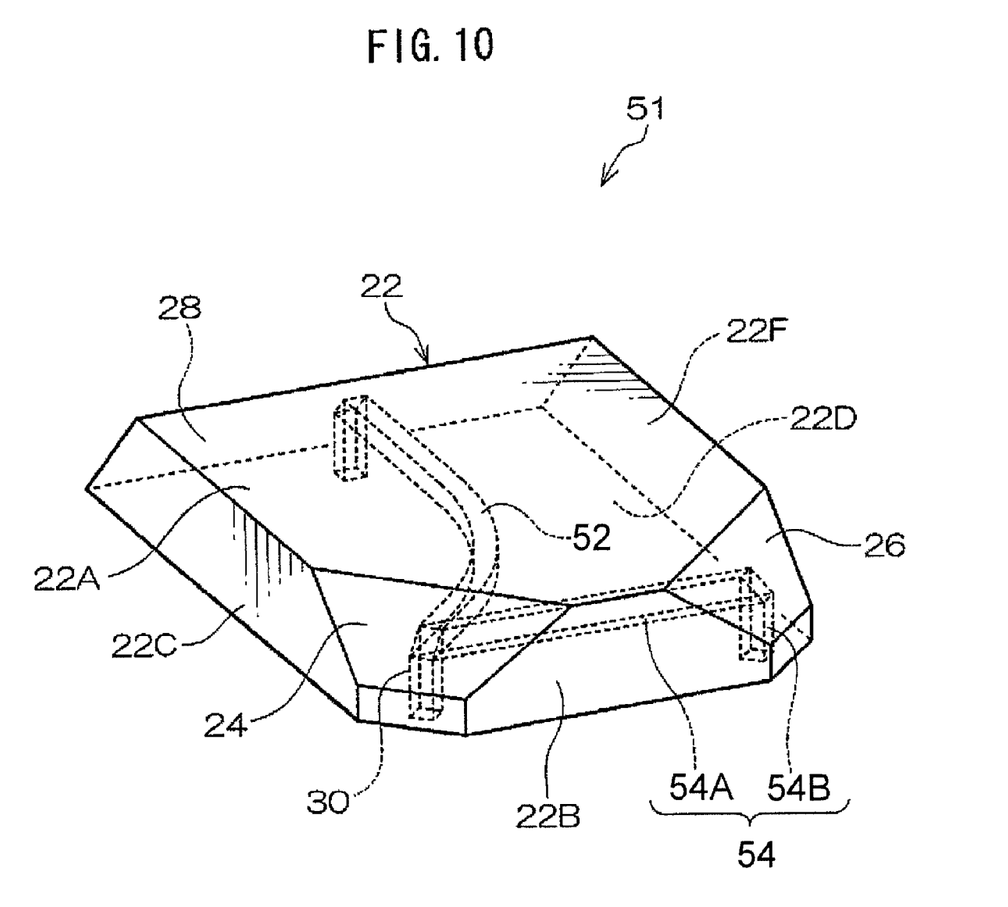
FIG. 10 is a perspective view of a modified example of the optical waveguide device relating to the second exemplary embodiment.

Next, by using a dicing saw having a 45° angle blade, two of the transverse direction corner portions of the waveguide sheet are cut-off at an angle of 45° with respect to the optical axis, so as to form 45° surfaces (the first mirror surface 24 and the second mirror surface 26) at the corner portions. Then, the waveguide sheet is turned upside-down, and the end side portion at the side opposite the first mirror surface 24 and the second mirror surface 26 is cut-off at a 45° angle with respect to the optical axis so as to form the third mirror surface 28 as shown in FIG. 10. A branched waveguide which is 3 mm square and has a thickness of 270 µm, such as shown in FIG. 10, is thereby formed.

An optical waveguide device 51 which is a modified example of the second exemplary embodiment is prepared in this way.

(Formation of Metal Mirrors)

Silver alloy films of a film thickness of 100 nm are formed by sputtering at the optical path changing portions formed at 45° angles.

EXAMPLE 4

(Fabrication of Optical Waveguide Device, and Packaging of VCSEL Element and Photodiode)

An optical waveguide device which is 3.0 mm square and has a thickness of 270 µm is prepared in the same way as in Example 3.

A VCSEL element and a photodiode for monitoring are disposed at the light incident portion and the light exiting portion of the above-described optical waveguide device 51, respectively, so as to form a light outputting module. This is packaged at a TO-46 CAN, so as to form a TOSA module.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical waveguide device comprising:
   a waveguide core that guides light;
   a mirror surface that deflects light coming from the waveguide core, wherein the mirror surface is formed of a single planar surface within a single plane, is irradiated by the light coming from the waveguide core, and is not wavelength-dispersive;
   a main waveguide core that guides a first part of the light deflected at the mirror surface;
   a waveguide core for monitoring that guides a second part of the light deflected at the mirror surface in a different direction from the main waveguide core, wherein the mirror surface is disposed at a common branching portion of the waveguide core, the main waveguide core and the waveguide core for monitoring; and
   a clad portion that surrounds the waveguide core, the main waveguide core, and the waveguide core for monitoring.

2. The optical waveguide device of claim 1, wherein the clad portion is substantially rectangular-plate-shaped, and the mirror surface is configured at a corner portion of a rectangular portion of the clad portion such that it forms 45° angles with each of three surfaces adjacent to the corner portion.

3. The optical waveguide device of claim 2, wherein the waveguide core is disposed along a thickness direction of the clad portion, the main waveguide core is disposed along a length direction of the clad portion, and the waveguide core for monitoring is disposed along a width direction of the clad portion.

4. The optical waveguide device of claim 3, wherein a second mirror surface, that deflects light coming from the waveguide core for monitoring by 90° so as to cause the light to travel along the thickness direction, is disposed at a corner portion that is adjacent to the corner portion of the clad portion.

5. The optical waveguide device of claim 2, wherein a second mirror surface, that deflects light coming from the main waveguide core by 90°, is disposed at a length direction end of the clad portion.

6. The optical waveguide device of claim 1, wherein the clad portion, the waveguide core, the main waveguide core, and the waveguide core for monitoring are an ultraviolet-curing or thermosetting epoxy resin.

7. The optical waveguide device of claim 1, wherein the clad portion, the waveguide core, the main waveguide core, and the waveguide core for monitoring are an ultraviolet-curing or thermosetting acrylic resin.

8. The optical waveguide device of claim 1, wherein the mirror surface is a flat surface with a surface roughness of from 1 nm to 50 nm.

9. The optical waveguide device of claim 1, wherein the mirror surface is a metal reflecting mirror that includes a metal film.

10. The optical waveguide device of claim 9, wherein the metal film includes at least one of gold, silver, copper, or alloys thereof.

11. An optical waveguide device comprising:
    a waveguide core that guides light;
    a mirror surface that deflects light coming from the waveguide core, wherein the mirror surface is formed of a single planar surface within a single plane, is irradiated by the light coming from the waveguide core, and is not wavelength-dispersive;
    a main waveguide core that guides a first part of the light deflected at the mirror surface;
    a waveguide core for monitoring comprising a branching portion common with the waveguide core and the main waveguide core, wherein the waveguide core for monitoring guides a second part of the light deflected at the mirror surface in a different direction from the main waveguide core, and guides the second part of the light for monitoring; and
    a clad portion that is rectangular-plate-shaped and surrounds the waveguide core, the main waveguide core, and the waveguide core for monitoring, wherein the mirror surface is configured at a corner portion of a rectangle of the clad portion.

12. The optical waveguide device of claim 11, wherein the waveguide core is disposed along a thickness direction of the clad portion, the main waveguide core is disposed along a length direction of the clad portion, and the waveguide core for monitoring is disposed along a width direction of the clad portion.

13. The optical waveguide device of claim 12, wherein a second mirror surface, that deflects light coming from the waveguide core for monitoring by 90° so as to cause the light to travel along the thickness direction, is disposed at a corner portion that is adjacent to the corner portion of the clad portion.

14. The optical waveguide device of claim 11, wherein a second mirror surface, that deflects light coming from the main waveguide core by 90°, is disposed at a length direction end of the clad portion.

15. The optical waveguide device of claim 11, wherein the clad portion, the waveguide core, the main waveguide core, and the waveguide core for monitoring are an ultraviolet-curing or thermosetting epoxy resin.

16. The optical waveguide device of claim 11, wherein the clad portion, the waveguide core, the main waveguide core, and the waveguide core for monitoring are an ultraviolet-curing or thermosetting acrylic resin.

17. The optical waveguide device of claim 11, wherein the mirror surface is a flat surface with a surface roughness of from 1 nm to 50 nm.

18. The optical waveguide device of claim 11, wherein the mirror surface is a metal reflecting mirror that includes a metal film.

19. The optical waveguide device of claim 18, wherein the metal film includes at least one of gold, silver, copper, or alloys thereof.

20. A light outputting module comprising:
    an optical waveguide device comprising:
      a waveguide core that guides light;
      a mirror surface that deflects light coming from the waveguide core, wherein the mirror surface is formed of a single planar surface within a single plane, is irradiated by the light coming from the waveguide core, and is not wavelength-dispersive;
      a main waveguide core that guides a first part of the light deflected at the mirror surface;
      a waveguide core for monitoring that guides a second part of the light deflected at the mirror surface in a different direction from the main waveguide core, wherein the mirror surface is disposed at a common branching portion of the waveguide core, the main waveguide core and the waveguide core for monitoring; and
      a clad portion that surrounds the waveguide core, the main waveguide core, and the waveguide core for monitoring;
    a surface emitting laser that is disposed at an outer side of a light incident opening of the waveguide core; and
    a light-receiving element for monitoring that is disposed at a light exit opening of the waveguide core for monitoring.

* * * * *